US009796602B2

(12) United States Patent
Faidi et al.

(10) Patent No.: US 9,796,602 B2
(45) Date of Patent: Oct. 24, 2017

(54) SOLAR WATER PURIFIER

(71) Applicant: NF Industries, LLC, Houston, TX (US)

(72) Inventors: Namir Faidi, Tiburon, CA (US); Stevan Davidovich, San Francisco, CA (US)

(73) Assignee: NF Industries, LLC, Houston, TX (US)

( * ) Notice: Subject to any disclaimer, the term of this patent is extended or adjusted under 35 U.S.C. 154(b) by 587 days.

(21) Appl. No.: 14/298,909

(22) Filed: Jun. 7, 2014

(65) Prior Publication Data

US 2014/0360859 A1     Dec. 11, 2014

Related U.S. Application Data

(60) Provisional application No. 61/832,680, filed on Jun. 7, 2013, provisional application No. 61/835,185, filed on Jun. 14, 2013.

(51) Int. Cl.
*C02F 1/14*     (2006.01)
*B01D 1/00*     (2006.01)
(Continued)

(52) U.S. Cl.
CPC .............. *C02F 1/14* (2013.01); *B01D 1/0035* (2013.01); *B01D 5/006* (2013.01); *B01D 5/0015* (2013.01);
(Continued)

(58) Field of Classification Search
CPC ................................. C02F 1/14; B01D 1/0035
See application file for complete search history.

(56) References Cited

U.S. PATENT DOCUMENTS 4,172,767 A * 10/1979 Sear ......................... C02F 1/047
                                                      159/903
5,650,050 A *  7/1997 Kaufmann ............... B01D 1/16
                                                      159/903
5,672,250 A *  9/1997 Ambadar ............. B01D 5/0012
                                                      202/169
(Continued)

FOREIGN PATENT DOCUMENTS

JP      09-155332      6/1997
JP      2012-245445    12/2012
(Continued)

OTHER PUBLICATIONS

KIPO, International Search Report and Written Opinion for PCT/US2014/041439, dated Oct. 2, 2014.

*Primary Examiner* — Jonathan Miller
(74) *Attorney, Agent, or Firm* — PatentBest; Andrew McAleavey

(57) ABSTRACT

A solar water purifier is disclosed. The solar water purifier uses waste heat from a solar panel, or direct heat from the sun, to boil, evaporate, and condense water to create a stream of purified water. In one embodiment, a boiling tank is mounted under and in direct thermal contact with a solar panel to absorb waste heat. In another embodiment, a transparent wall of the boiling tank is directly exposed to solar energy. Unpurified water enters the boiling tank from an inlet tank. Once in the boiling tank, a stream of steam and water vapor leaves the tank and is allowed to condense within a condenser. The condenser is located within the inlet tank, such that the heat recovered during condensation is used to preheat the inlet water to the boiling tank.

20 Claims, 4 Drawing Sheets

(51) Int. Cl.
  *B01D 5/00*   (2006.01)
  *C02F 1/00*   (2006.01)
(52) U.S. Cl.
  CPC ........ *C02F 1/001* (2013.01); *C02F 2201/009* (2013.01); *C02F 2303/04* (2013.01); *Y02P 70/34* (2015.11)

(56) References Cited

U.S. PATENT DOCUMENTS

| | | | | |
|---|---|---|---|---|
| 6,656,326 | B2* | 12/2003 | Nagler | B01D 1/0005 126/600 |
| 7,866,176 | B2* | 1/2011 | Vetrovec | B01D 5/0066 202/234 |
| 8,808,497 | B2* | 8/2014 | Duesel, Jr. | B01D 1/0005 159/16.1 |
| 9,187,341 | B2* | 11/2015 | Kerschgens | B01D 1/0023 |
| 9,468,863 | B2* | 10/2016 | Roth, Jr. | C02F 1/14 |
| 2003/0150704 | A1* | 8/2003 | Posada | B01D 1/04 203/1 |
| 2006/0016682 | A1* | 1/2006 | Lin | B01D 5/0066 202/234 |
| 2007/0193870 | A1* | 8/2007 | Prueitt | B01D 1/0035 202/176 |
| 2008/0164135 | A1* | 7/2008 | Slook | B01D 1/0035 202/83 |
| 2012/0298499 | A1 | 11/2012 | Lee | |

FOREIGN PATENT DOCUMENTS

| | | |
|---|---|---|
| KR | 10-2002-0066502 | 8/2002 |
| WO | 03-008338 | 1/2003 |

* cited by examiner

SOLAR WATER PURIFIER

CROSS-REFERENCE TO RELATED APPLICATIONS

This application claims priority to U.S. Provisional Patent Application No. 61/832,680, filed Jun. 7, 2013, and also to U.S. Provisional Patent Application No. 61/835,185, filed Jun. 14, 2013, the contents of both of which are incorporated by reference herein in their entirety.

BACKGROUND OF THE INVENTION

1. Field of the Invention

This invention relates to the use of solar energy to boil and purify drinking water.

2. Description of Related Art

About two billion people do not have access to clean, fresh water. Most of earth's water cannot be used for drinking, cooking, or bathing, due to dissolved natural salts, bacterial or parasitic contamination, or chemical contamination. While unpurified water can often be used for some purposes, it must be purified if it is to be used for drinking Water purification can be done by a number of different processes, including reverse osmosis and evaporation-condensation processes.

Although effective processes for water purification are well known, these processes are also energy intensive. For example, in evaporation-condensation processes, water is typically heated to convert it to steam and then condensed back into the liquid phase. The heating process kills many organisms found in unpurified water, but requires a great deal of energy. Unfortunately, many of the places that do not have clean, fresh water also do not have access to reliable sources of power or established power grids. A common solution to the lack of reliable power sources, particularly for sunny areas of the globe, is to use photovoltaic panels to convert solar energy to electricity.

Photovoltaic cells cannot use all of the wavelengths of light in the solar spectrum to produce electricity. They particularly have trouble using infrared and ultraviolet wavelengths of light, and even for those wavelengths that can be converted into electricity, the conversion is not particularly efficient. An average solar panel is capable of converting only about 20% of the solar energy it absorbs into electricity; the other 80% is lost, typically as heat energy. Solar panels are also relatively expensive.

SUMMARY OF THE INVENTION

One aspect of the invention relates to a solar water purifier. The solar water purifier uses solar energy to purify water by boiling, evaporation, condensation, and optionally, filtering. In some cases, the energy used may be waste energy from a solar panel. In the solar water purifier, a boiling tank accepts solar energy to boil water. An inlet tank is in fluid communication with the boiling tank and provides unpurified water to it. A stream of steam and water vapor leaving the boiling tank is directed into a condenser, where it is converted to a stream of purified water. The condenser is preferably located within the inlet tank, such that heat withdrawn from stream during condensation is used to preheat the water entering the boiling tank. In some embodiments, the boiling tank may be mounted directly beneath and in thermal communication with the underside of the solar panel. Pumps and other elements used to run the solar water purifier may draw electrical power from the solar panel.

Another aspect of the invention also relates to a solar water purifier. The solar water purifier according to this aspect of the invention has a boiling tank with at least one face made of a light-transmissive material, such as glass. The purifier also includes an inlet tank that is in relatively free fluid communication with the boiling tank. The inlet tank may be relatively open, while the boiling tank is sealed with egress of water vapor and steam controlled by a check valve. Once the check valve opens and steam and water vapor do leave the boiling tank, they are routed through a condenser, where they are reconverted to now-purified liquid water. The condenser is disposed in the inlet tank so that waste heat from the condenser can be used to pre-heat the water in the inlet tank. In embodiments according to this aspect of the invention, hydrostatic pressure and the pressure at which the check valve opens can be used to control the rate at which water flows through the purifier and, in some cases, the temperature at which the unpurified water is boiled.

Yet another aspect of the invention relates to a solar water purifier as described above with an inlet tank that has higher walls than the boiling tank and can thus maintain higher water levels that create greater hydrostatic pressure. A further aspect of the invention relates to a solar water purifier as described above with an inlet tank that has high, shaped walls that allow greater and varying hydrostatic pressure.

Other aspects, features, and advantages will be set forth in the description that follows.

BRIEF DESCRIPTION OF THE DRAWING FIGURE

The invention will be described with respect to the following drawing figures, in which like numerals represent like features throughout the figures, and in which.

Figure 3:
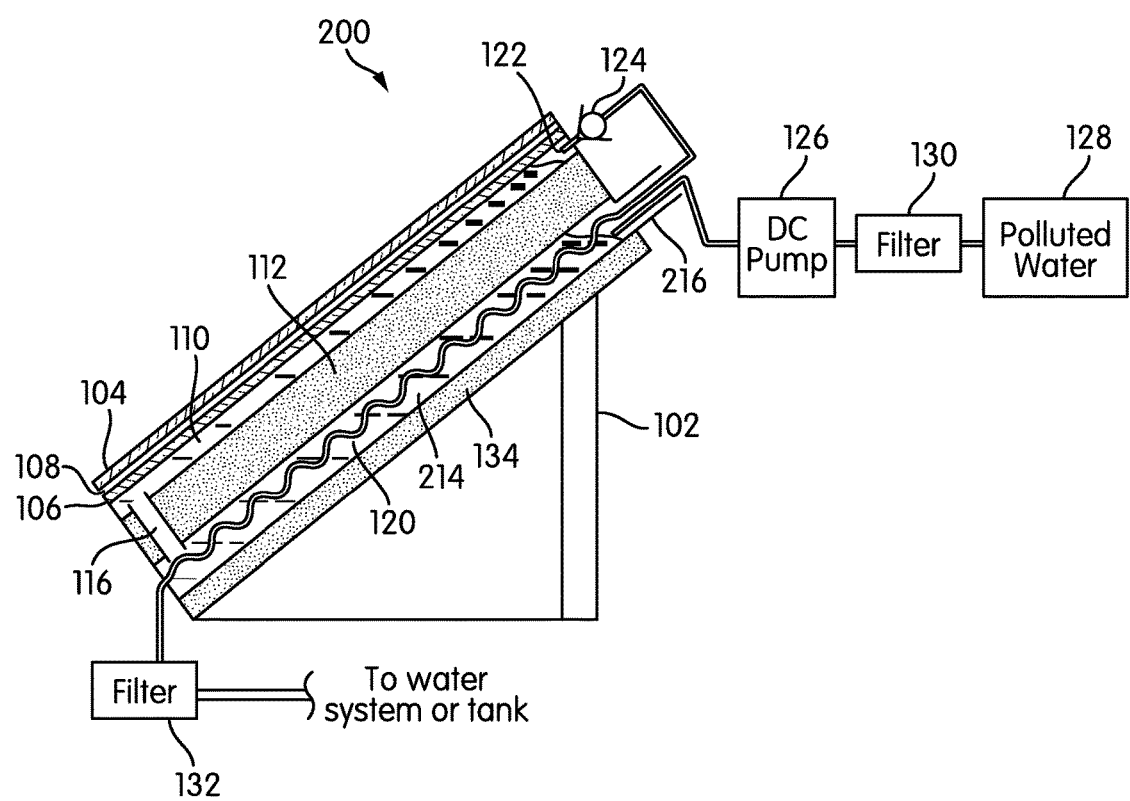
Figure 4:
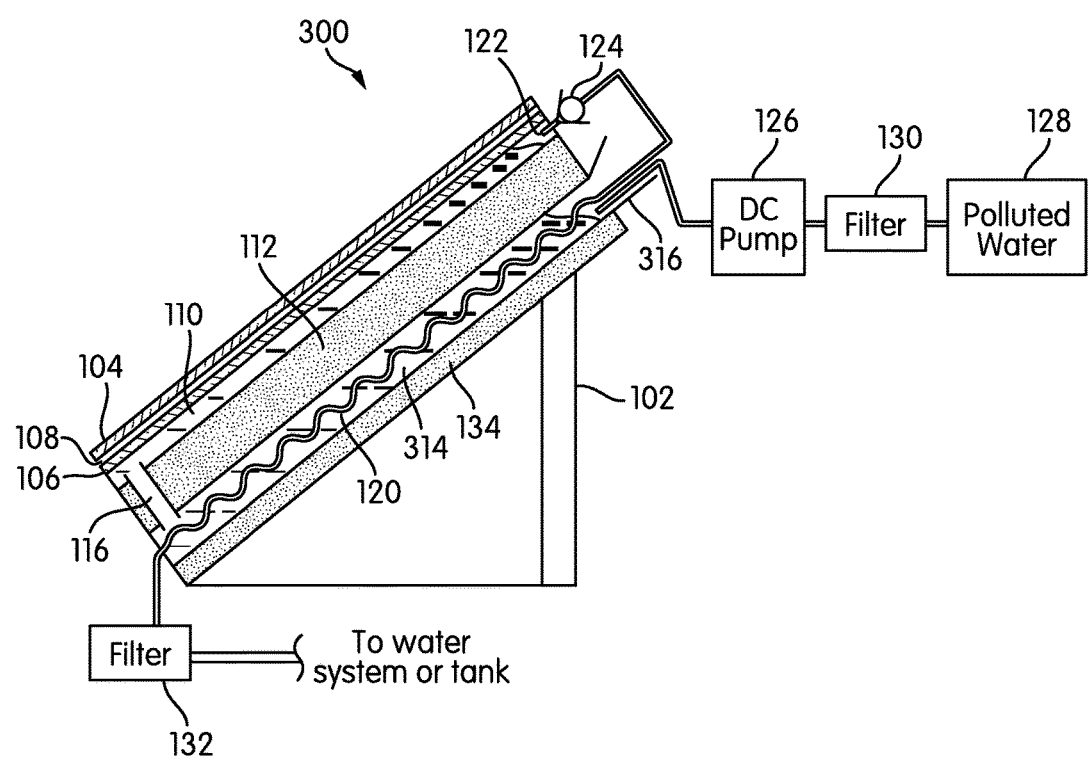

FIG. 3 is a schematic cross-sectional view of a water purification apparatus without an integrated solar panel array, illustrating one type of modification to increase hydrostatic pressure in the apparatus; and FIG. 4 is a schematic cross-sectional view of a water purification apparatus without an integrated solar panel array, illustrating another type of modification to increase hydrostatic pressure in the apparatus.

DETAILED DESCRIPTION

Figure 1:
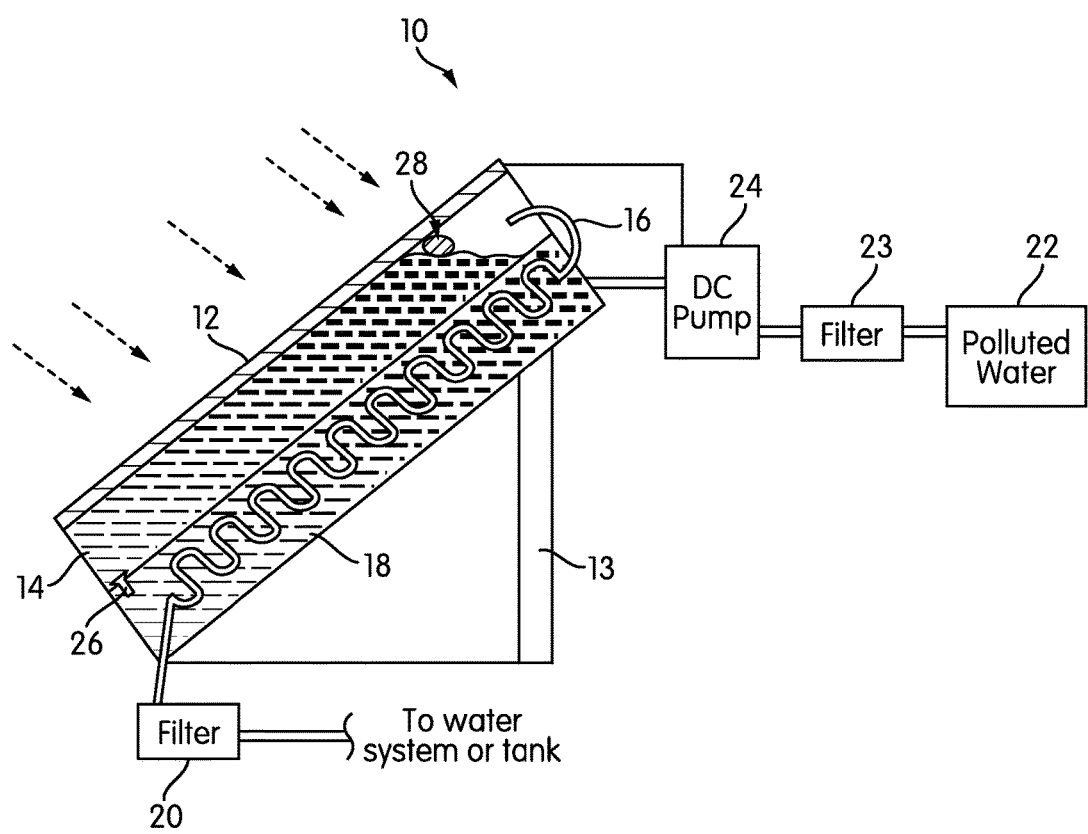
FIG. 1 is a schematic cross-sectional view of a water purification apparatus according to one embodiment of the invention.

FIG. 1 is a schematic cross-sectional view of one embodiment of a water purifier, generally indicated at 10. In the water purifier 10, a conventional photovoltaic solar panel 12 is supported on appropriate support structure 13 and is oriented to the sun to absorb its energy. While not shown in FIG. 1, the solar panel 12 may have any type of framing and support elements known in the art.

As was explained above, in a conventional solar panel, solar energy that cannot be converted to electricity is simply lost, mostly as radiated heat. However, the water purifier 10 makes use of that waste heat and other forms of waste energy to purify water. More specifically, in the water purifier 10, a boiling tank 14 is mounted under the solar panel 12 and in thermal communication with it, such that waste heat is directed into the boiling tank 14. In some embodiments, features may be included to increase or optimize thermal transfer between the solar panel 12 and the boiling tank, including conductive plates or adhesives between them, or mechanical features on the rear of the solar panel 12, like heat sink fin structures, that protrude into the boiling tank 14.

Ideally, the waste heat from the solar panel 12 causes the water in the boiling tank 14 to heat and boil. The boiling of the water in the tank 14 would typically kill most biological contaminants. As water boils off from the boiling tank 14, it is drawn or directed into a condenser 16 and is allowed to condense there. In FIG. 1, the condenser 16 is schematically illustrated as coiled tubing, although it may take any form known in the art. In order to cause the steam and water vapor to condense back into liquid water, the condenser 16 is maintained at a lower temperature.

In the illustrated embodiment, the condenser is maintained at a lower temperature by placing the condenser 16 inside an inlet tank 18, into which unpurified water is pumped or deposited prior to entering the boiling tank 14. The incoming unpurified water, initially presumed to be at ambient temperature, is significantly cooler than the water vapor or steam in the condenser 16, and thus, causes the water vapor to condense into liquid water. With the condenser 16 located as it is, the heat drawn off in the condensation process also has the effect of preheating the water in the inlet tank 18 before it enters the boiling tank 14. However, as those of skill in the art will appreciate, while the condenser 16 may be in thermal contact with the inlet tank 18, the water within the condenser 16 and the water in the inlet tank 18 are kept isolated from one another. In some embodiments, insulation may be placed between the boiling tank 14 and the inlet tank 18.

The water condensing within the condenser 16 is put through a filter 20, which may be a standard charcoal filter, before being deposited in a collection tank or entering a water system.

The water purifier 10 may be operated in batches or in a continuous feed mode. As was noted briefly above, water may be pumped from a source of polluted water 22 into the inlet tank 18 by a pump 24. A filter 23 is interposed between the source of polluted water 22 and the pump 24 in order to prevent silt, particulate matter, and other elements that could damage the pump 24 from reaching it, although if the water source is relatively free of such contaminants, the filter 23 may be omitted. Preferably, the pump 24 is a direct current (DC) pump that draws power from the solar panel 12. Of course, particularly if the water purifier 10 is operated in batch mode, the inlet tank 18 may be the only source of unpurified water, and that water may be placed in the inlet tank 18 manually.

As shown in FIG. 1, an inlet valve 26 controls the unidirectional flow from the inlet tank 18 into the boiling tank 14. In some embodiments, the opening of the inlet valve 26 may be timer-controlled. In other embodiments, a simple float 28 at the upper end of the boiling tank 14 would be coupled to the inlet valve 26, such that when the water level in the boiling tank 14 drops below a pre-set level, the inlet valve 26 is opened and more water is admitted for purification. (A pump coupled to the inlet valve 26 is not shown in FIG. 1, but may be included, and, like the pump 24, would typically be DC-powered and electrically connected to the solar panel 12.) Both tanks 14, 18, the condenser 16, and the other elements may have access doors or ports to allow them to be cleaned or flushed.

In a continuous or fed-batch mode, the amount of water that the water purifier 10 can purify per unit amount of time will depend on the amount of energy incident on the solar panel 12, the efficiency of the solar panel 12, the efficiency of thermal transfer between the solar panel 12 and the boiling tank 14, the temperature differential between the incoming unpurified water and the boiling point of water, and other factors.

Certain other features and variations may be made in other embodiments of the invention. For example, the boiling tank 14 may be thermally insulated, such that it acts as a heat sink for the solar panel 12 but loses less thermal energy to convection or radiation. Additionally, although the inlet tank 18 is shown as being directly underneath the boiling tank 14, it may be located elsewhere in other embodiments. Moreover, while it is possible for the solar panel 12 to be connected to a solar charge controller and a set of batteries to store electricity or to supply electricity for other purposes, in the interest of simplicity, this may not be done in most embodiments.

Figure 2:
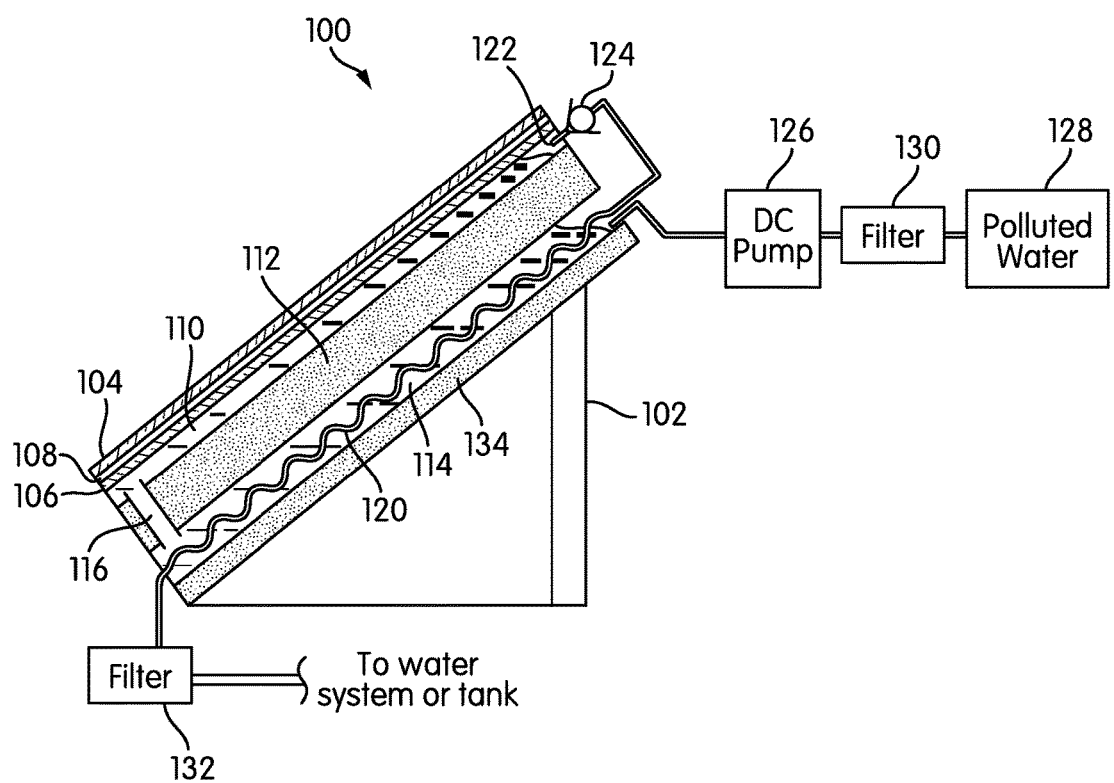
FIG. 2 is a schematic cross-sectional view of a water purification apparatus without an integrated solar panel according to another embodiment of the invention.

FIG. 2 is a schematic cross-sectional view of a solar water purifier, generally indicated at 100, according to another embodiment of the invention. Like the apparatus 10 of FIG. 1, the apparatus 100 is supported on support structure 102 at an appropriate angle to catch the sun's rays. As those of skill in the art will appreciate, the angle may be adjustable.

The apparatus 10 of FIG. 1 includes an integrated solar panel 12. However, an integrated solar panel 12 is not necessary in all embodiments. Instead, in some embodiments, the sun's rays may fall directly on a boiling tank, and the sun-facing wall of the boiling tank may be made of glass or another suitable, transparent or energy-transmissive material, so as to expose the water in the boiling tank to the maximum amount of energy possible.

In the apparatus 100 of FIG. 2, the sun-facing surface of the apparatus is comprised of two sheets 104, 106 of glass, separated by a small air gap 108. In some cases, the sheets 104, 106 may be made of another transparent material, such as polymethyl methacrylate (PMMA; PLEXIGLAS®) or polycarbonate, or one sheet 104, 106 may be glass and the other a transparent plastic material 104, 106. The air gap 108 provides for insulation, and altogether, the two sheets 104, 106 with their interposed air gap 108 serve as the forward wall of a boiling tank 110.

The rear wall 112 of the boiling tank 110 is comprised of insulation, such as polystyrene foam, and may also include thin layers of metal foil or plastic material to isolate the water from the insulation itself. Behind the rear wall 112 of the boiling tank 110 is the inlet tank 114. Typically, the boiling tank 110 is relatively thin, such that the solar energy can penetrate, reach, and heat all of the water in the tank 110. For example, in one embodiment, the boiling tank 110 may have a depth in the range of about ½ inch to about 1 inch. The inlet tank 114, by contrast, may have a depth in the range of about 1 inch to about 2 inches. The thickness of the insulation 112 between the two tanks 110, 114 will vary with the nature of the insulating material. In one embodiment, the insulation may be, e.g., polystyrene foam with a thickness of about 4 inches. Of course, any insulative material may be used.

An open passageway 116 defined in the rear wall 112 connects the inlet tank 114 and the boiling tank 110 and allows water to flow essentially freely between the two. In contrast to the apparatus 10 of FIG. 1, in which an inlet valve 24 controls the flow between the inlet tank 18 and the boiling tank 14, in the apparatus 100, there is no such valve. Rather, the inventors have discovered that differences in pressures between the inlet tank 114 and the boiling tank 110 can be used to control the rate of water flow from the inlet tank 114 into the boiling tank 110.

The boiling tank 110 is sealed, except for the passageway 116 connecting it to the inlet tank 114, while the inlet tank 114 is open to atmosphere. Steam and water vapor from the boiling tank 110 are drawn off into a condenser 120, and as with the apparatus 10, the condenser 120 is physically situated within the inlet tank 114, such that waste heat from the condenser 120 preheats the water in the inlet tank 114. However, the inlet pipe 122 to the condenser 120 includes a pressure-triggered one-way check valve 124 that allows steam to flow only from the boiling tank 110 into the condenser 120. That check valve 124 may be selected or configured such that a certain pressure builds up in the boiling tank 110 before the valve 124 opens.

Because there is an open passageway 116 between the two tanks 110, 114, the pressure at which the check valve 124 opens and the water level in the inlet tank 114 determine the rate at which water flows from the inlet tank 114 into the boiling tank 110. Essentially, if the water level in the inlet tank 114 is kept higher than the water level in the boiling tank 110, the hydrostatic pressure differential will cause water to flow into the boiling tank 110 at a rate that is counterbalanced by the steam pressure within the boiling tank 110.

This type of pressure control has another advantage: it is possible to adjust the pressure of the check valve 124 such that the water will boil at its conventional, sea level temperature. However, in some embodiments, it may be desirable to heat the water to higher temperatures, in order to kill specific organisms, or for other reasons. In that case, the check valve 124 can be selected or configured to open at an appropriate, higher pressure. This technique can also be used to compensate if the apparatus 100 is to be used at higher elevations, where the lower atmospheric pressure would otherwise cause the water to boil at lower temperatures that would not kill all of the pathogens.

A pump 126 may be used to pump water into the inlet tank 114 so as to maintain desired water and pressure levels within the apparatus 100. A float, or another conventional type of water level sensor, may be used to control the water level at which the pump 126 activates. The pump 126 is typically in communication with a supply of polluted water 128 or water that otherwise needs to be purified. While not shown in the figure, the pump 126 may be connected to a solar panel or a battery that draws its energy from a solar panel. A filter 130 may be interposed between the water source 128 and the pump 126 to filter contaminants and prevent the pump 126 from being damaged by particulate matter. Water drawn off from the condenser 120 is passed through another filter 132. The rear of the inlet tank 114 is defined by a second insulation panel 134, which is typically thinner than the insulation panel 112, because the water in the inlet tank 114 is cooler than the water in the boiling tank 110.

Additional changes and improvements may be made to the apparatus 100 to increase the hydrostatic pressure within the apparatus or to increase its controllability. For example, FIG. 3 is a schematic cross-sectional view of an apparatus 200 according to another embodiment of the invention. The apparatus 200 is similar in most respects to the apparatus 100 of FIG. 2, has most of the same components as the apparatus 100, and the description above will suffice for those components. The primary difference is that apparatus 200 has an inlet tank 214 with walls that extend beyond those of the boiling tank 110. The higher walls of the inlet tank 214 allow the inlet tank 214 to be filled to a higher water level, which increases the hydrostatic pressure in the apparatus 200 and may contribute to processing water at a higher rate.

FIG. 4 is a schematic cross-sectional view of an apparatus, generally indicated at 300, according to yet another embodiment of the invention. The apparatus 300 is substantially similar to the apparatus 100 of FIG. 2 and shares many of its features. Therefore, the description above will suffice for those features.

Like in the apparatus 200, the walls of the inlet tank 314 of the apparatus 300 rise above the height of the boiling tank 110, allowing a higher water level and greater hydrostatic pressure in the inlet tank 314. However, in addition to the increased wall height of the inlet tank 314, the upper end 316 of the inlet tank 314 also flares outward. The outward flare of the upper end 316 allows not only increased hydrostatic pressure, but variable, controllable hydrostatic pressure. Although the upper end 316 has a generic, flared shape similar to that of a funnel, the upper end of other embodiments may be made in any shape, in order to establish a desired relationship between water height in the inlet tank 314 and hydrostatic pressure.

Although the apparatuses 100, 200, 300 of FIGS. 2-4 are not shown in association with a solar panel, in some embodiments, a solar panel may be included and associated with the apparatus 100, 200, 300. If a solar panel is used, the solar panel may be smaller than one used in the apparatus 10 of FIG. 1, and would generally provide power for any accessory components, such as the pump 126.

Additionally, while it may be desirable in most embodiments to use solar energy as the sole energy source for boiling water in apparatuses 10, 100, 200, 300 according to embodiments of the invention, in some embodiments, it may be necessary or desirable to include electrical heating elements, such as resistive heating elements, in the boiling tank 14, 110. These electrical heating elements may be useful in preheating the water to a desired temperature when the apparatus 10, 100, 200, 300 first begins operation, or in maintaining temperature temporarily if the sun intensity decreases significantly while the apparatus 10, 100, 200, 300 is in use. If present, electrical heating elements may be powered by an accessory solar panel.

In other embodiments, the sun's energy may be focused on the boiling tank 14, 110. In these embodiments, the outer pane of glass 104 may be concave or convex and may serve as a lens to focus the sun's rays on the boiling tank. For example, a relatively flat Fresnel lens may be particularly suitable in some embodiments. Moreover, while the boiling tank 14, 110 and the inlet tank 18, 114, 214, 314 are shown as being roughly the same size in the figures, the boiling tank 14, 110 may, in fact, be much smaller, particularly in cases where a lens is used to focus the sun. In that case, the boiling tank 14, 110 may be small and centered on the focal point of the lens. As those of skill in the art will appreciate, the spacing of the outer sheet of glass 104 may be altered and the width of the air gap 108 increased, depending on the focal length of the lens. In other embodiments, a separate lens may be mounted above the boiling tank 14, 110 on a bracket.

Additionally, in some embodiments, reflectors may be used to direct more solar energy onto the boiling tank 14, 110. Generally speaking, a reflector is any kind of reflective panel that can reflect and redirect light. The classic reflector is a mirror, although polished metal surfaces and other suitable materials may also be used. When used with embodiments of the present invention, reflectors may be free-standing and placed in proximity to the apparatus 10, 100, 200, 300, or one or more reflectors may be directly attached to the apparatus 10, 100, 200, 300. Preferably, the reflectors are mounted on hinged or jointed mounts that allow the angles of the reflectors to be adjusted. In some cases, both a lens or lenses and reflectors may be used.

Although some of the description above may focus on areas of the world where clean water is not readily available, apparatus 10, 100, 200, 300 according to embodiments of the invention may find a wide variety of applications. For example, an apparatus 10, 100, 200, 300 may be connected to a household gutter system and used to purify collected rain water.

Additionally, water produced by an apparatus 10, 100, 200, 300 according to embodiments of the invention may be used to produce water for irrigation and other agricultural applications. In that case, desalination may be the primary objective, and it may not be necessary to filter the stream of water from the condenser 16, 120. It may also be possible to omit final filtration of the condensate if the water is to be used for clothes washing and other non-drinking applications.

While the invention has been described with respect to certain embodiments, the embodiments are intended to be illuminating, rather than limiting. Modifications and changes may be made within the scope of the invention, which is defined by the appended claims.

What is claimed is:

1. A solar water purifier, comprising:
    a container divided unequally into a boiling tank and an inlet tank, such that the boiling tank is smaller in at least one dimension than the inlet tank,
        the boiling tank having at least one transparent wall and being closed to atmosphere, and
        the inlet tank being (1) in fluid communication with, and sharing at least one wall with, the boiling tank, (2) open to atmosphere and (3) adapted to contain a supply of unpurified water;
    an outlet coupled to the boiling tank, the outlet being adapted to collect steam and water vapor from the boiling tank;
    a condenser connected to the outlet; and
    a valve between the outlet and the condenser, the valve being constructed and arranged to open when the pressure in the boiling tank reaches a defined pressure;
    wherein solar energy incident on the at least one transparent wall of the boiling tank causes water in the boiling tank to boil.

2. The solar water purifier of claim 1, wherein the condenser is disposed in the inlet tank, such that waste heat from the condenser preheats water in the inlet tank.

3. The solar water purifier of claim 1, wherein a water level in the inlet tank creates a first hydrostatic pressure, causing water to flow into the boiling tank.

4. The solar water purifier of claim 3, wherein the inlet tank is taller than the boiling tank.

5. The solar water purifier of claim 4, wherein an upper portion of the inlet tank is broader than a lower portion of the inlet tank.

6. The solar water purifier of claim 1, wherein the inlet tank and the boiling tank are in fluid communication via an open passageway proximate to the bottoms of the inlet tank and the boiling tank.

7. The solar water purifier of claim 1, further comprising insulation disposed between the boiling tank and the inlet tank.

8. The solar water purifier of claim 1, further comprising a pump in communication with the supply of unpurified water, the pump being configured to convey the water into the inlet tank.

9. The solar water purifier of claim 1, further comprising a filter in communication with an outlet of the condenser.

10. The solar water purifier of claim 1, further comprising a lens configured and arranged to focus solar energy on the boiling tank.

11. The solar water purifier of claim 10, wherein at least a portion of the transparent wall serves as the lens.

12. A solar water purifier, comprising:
    a container divided unequally into a boiling tank and an inlet tank, such that the boiling tank is smaller in at least one dimension than the inlet tank,
        the boiling tank having at least one transparent wall and being closed to atmosphere,
        the inlet tank being open to atmosphere and adapted to contain a supply of unpurified water, and
        a thermally insulated shared wall between the boiling tank and the inlet tank, the wall having an opening in a lower portion thereof that places the inlet tank in fluid communication with the boiling tank;
    an outlet coupled to the boiling tank, the outlet being adapted to collect steam and water vapor from the boiling tank;
    a condenser connected to the outlet; and
    a valve between the outlet and the condenser, the valve being constructed and arranged to open when the pressure in the boiling tank reaches a defined pressure;
    wherein solar energy incident on the at least one transparent wall of the boiling tank causes water in the boiling tank to boil.

13. The solar water purifier of claim 12, wherein the condenser is disposed in the inlet tank, such that waste heat from the condenser preheats water in the inlet tank.

14. The solar water purifier of claim 12, wherein a water level in the inlet tank creates a first hydrostatic pressure, causing water to flow into the boiling tank.

15. The solar water purifier of claim 14, wherein the inlet tank is taller than the boiling tank.

16. The solar water purifier of claim 15, wherein an upper portion of the inlet tank is broader than a lower portion of the inlet tank.

17. The solar water purifier of claim 12, further comprising a pump in communication with the unpurified water, the pump being configured to convey the water into the inlet tank.

18. The solar water purifier of claim 12, further comprising a filter in communication with an outlet of the condenser.

19. The solar water purifier of claim 12, further comprising a lens configured and arranged to focus solar energy on the boiling tank.

20. The solar water purifier of claim 19, wherein at least a portion of the transparent wall serves as the lens.

* * * * *